United States Patent
Jang et al.

(10) Patent No.: US 11,611,208 B2
(45) Date of Patent: Mar. 21, 2023

(54) ELECTRONIC APPARATUS

(71) Applicant: SAMSUNG ELECTRONICS CO., LTD., Suwon-si (KR)

(72) Inventors: Duhee Jang, Suwon-si (KR); Jeongil Kang, Suwon-si (KR); Kasan Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 19 days.

(21) Appl. No.: 17/060,194

(22) Filed: Oct. 1, 2020

(65) Prior Publication Data
US 2021/0119437 A1    Apr. 22, 2021

(30) Foreign Application Priority Data

Oct. 16, 2019    (KR) .................. 10-2019-0128610

(51) Int. Cl.
*H02H 3/22* (2006.01)
*H02H 9/04* (2006.01)
*H01F 27/34* (2006.01)

(52) U.S. Cl.
CPC .......... *H02H 3/22* (2013.01); *H01F 27/343* (2013.01); *H02H 9/041* (2013.01); *H02H 9/042* (2013.01)

(58) Field of Classification Search
CPC ............ H02H 3/22; H02H 9/04; H02H 9/042; H02H 9/041; H02H 7/122; H02H 7/125; H02H 9/043; H02H 9/046; H02H 9/06; H01F 27/34; H01F 27/343; H01C 8/04; H01C 7/12; H01C 7/06; H02M 1/32; H02M 1/44

USPC .......................................... 361/18, 117–120
See application file for complete search history.

(56) References Cited

U.S. PATENT DOCUMENTS

| | | | | |
|---|---|---|---|---|
| 4,677,518 A | * | 6/1987 | Hershfield | H02H 9/06 361/118 |
| 10,193,437 B1 | * | 1/2019 | Hari | H02M 1/4208 |
| 2012/0026639 A1 | * | 2/2012 | Wright | H02H 9/041 361/118 |
| 2013/0229733 A1 | | 9/2013 | Woo et al. | |
| 2016/0252367 A1 | * | 9/2016 | Banhegyesi | G01D 4/002 340/870.02 |
| 2017/0302160 A1 | * | 10/2017 | Marcinkiewicz | H02M 1/08 |
| 2017/0302165 A1 | * | 10/2017 | Marcinkiewicz | H02M 1/4216 |

* cited by examiner

*Primary Examiner* — Danny Nguyen
(74) *Attorney, Agent, or Firm* — Sughrue Mion, PLLC (57) ABSTRACT

An electronic apparatus is provided. The electronic apparatus includes: a main circuit; and a power supply circuit configured to receive external power from an external power supply and supply operating power to the main circuit. The power supply circuit includes: a converter; and a lightning protection circuit that includes: a varistor configured to have a first rated voltage corresponding to a breakdown voltage of a device of the converter; and a surge arrester connected in series to the varistor and configured to have a second rated voltage, and based on the external power being higher than the first rated voltage of the varistor, the varistor is clamped so that a voltage applied to the converter does not exceed the first rated voltage, and based on a voltage applied to the surge arrester being equal to or higher than the second rated voltage, the surge arrester is short-circuited.

14 Claims, 10 Drawing Sheets

ELECTRONIC APPARATUS

CROSS-REFERENCE TO RELATED APPLICATION

This application is based on and claims priority under 35 U. S. C. § 119 to Korean Patent Application No. 10-2019-0128610, filed on Oct. 16, 2019, the disclosure of which is incorporated by reference herein in its entirety.

BACKGROUND

1. Field

The disclosure relates to an electronic apparatus including a circuit capable of protecting the electronic apparatus when an overvoltage is applied to the electronic apparatus.

2. Description of Related Art

When an overvoltage or a surge occurs an electronic apparatus and the like due to, for example, a lightning strike, components of the electronic apparatus may be damaged. Therefore, it is necessary to protect the components of the electronic apparatus by lowering such a sudden spike in voltage to a certain voltage that may be endurable by the electronic apparatus, and this can be achieved by using electrical components, such as a varistor. In the related art, an electronic apparatus uses a bridge diode and a power factor correction circuit (PFC) when an input voltage is higher than an output voltage. In this case, since the voltage is lowered by applying a certain voltage to a capacitor of the power factor correction circuit, the components of the electronic apparatus are protected from the overvoltage.

However, when a rated voltage of the varistor is low, breakdown voltages of the components of the electronic apparatus also have to be low, and thus the components of the electronic apparatus are protected under the condition that the breakdown voltage of the components are also low. Here, when the overvoltage is applied, the varistor cannot withstand the overvoltage and may be destroyed. Conversely, if the rated voltage of the varistor is high, while the breakdown voltages of the components may be increased, design constraints and higher costs may be imposed.

SUMMARY

Provided is an electronic apparatus including a circuit capable of protecting components of the electronic apparatus when an overvoltage is applied to the electronic apparatus, at low cost while minimizing design constraints.

Additional aspects will be set forth in part in the description which follows and, in part, will be apparent from the description, or may be learned by practice of the presented embodiments.

In accordance with an aspect of the disclosure, there is provided an electronic apparatus including: a main circuit; and a power supply circuit configured to receive external power from an external power supply and supply operating power to the main circuit. The power supply circuit includes: a converter configured to convert the external power from the external power supply into the operating power; and a lightning protection circuit connected in parallel between the external power supply and an input end of the converter. The lightning protection circuit includes: a varistor configured to have a first rated voltage corresponding to a breakdown voltage of a device of the converter; and a surge arrester connected in series to the varistor and configured to have a second rated voltage, wherein, based on the external power of the external power supply being higher than the first rated voltage of the varistor and being applied to the varistor and the surge arrester, the varistor is clamped so that a voltage applied to the converter does not exceed the first rated voltage, and wherein, based on a voltage applied to the surge arrester being equal to or higher than the second rated voltage, the surge arrester is short-circuited.

The external power supply includes a commercial AC power supply, and the lightning protection circuit is connected to both ends of the commercial AC power supply.

The lightning protection circuit is connected to both ends of the external power supply and shares the same ground as the external power supply.

The lightning protection circuit further includes a second varistor connected between a first series of the varistor and the surge arrester and the external power supply, and configured to have a third rated voltage.

The third rated voltage of the second varistor is higher than a first sum of the first rated voltage of the varistor and the second rated voltage of the surge arrester.

The lightning protection circuit further includes a second surge arrester connected in series to the second varistor, and configured to have a fourth rated voltage.

The power supply circuit further includes an EMI filter including a coil that is provided between the second varistor and the varistor, and a capacitor is connected in parallel with the lightning protection circuit.

The lightning protection circuit further includes a third varistor connected between the second varistor and the external power supply.

A fifth rated voltage of the third varistor is higher than a second sum of the third rated voltage of the second varistor and the fourth rated voltage of the second surge arrester.

The EMI filter includes: a first EMI filter including a first coil that is provided between the varistor and the second varistor, and a first capacitor that is connected in parallel with a first series of the varistor and the surge arrester; and a second EMI filter including a second coil that is provided between the second varistor and the third varistor, and a second capacitor that is connected in parallel with a second series of the second varistor and the second surge arrester.

The converter includes a power factor correction circuit configured to perform a power factor correction of the power supply circuit.

The power supply circuit further includes a synchronous bridge type rectifier circuit.

The power supply circuit further includes a bridgeless type rectifier circuit including a switch.

The main circuit includes a processor configured to execute a control program of the electronic apparatus.

The electronic apparatus further includes: a display configured to display an image, wherein the main circuit includes a driving circuit configured to drive the display.

The converter includes a switch mode type DC-DC converter.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, embodiments of the disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the disclosure are not limited only to the configuration or operation described in the following example embodiments. In describing the disclosure, if it is determined that a detailed description of the known technology or configuration related to the disclosure may unnecessarily obscure the subject matter of the disclosure, the detailed description thereof will be omitted.

In the disclosure, terms including ordinal numbers such as first and second may be used for the purpose of distinguishing one component from other components, and singular expressions include plural expressions unless the context clearly indicates otherwise. Also, it should be understood that terms such as 'configured', 'include', and 'have' do not preclude the existence or addition of one or more other features or numbers, steps, operations, components, parts, or combinations thereof. In addition, a 'module' or a 'unit' performs at least one function or operation, and may be implemented in the form of hardware or software, or a combination of hardware and software, and may be integrated into at least one module. Furthermore, at least one of the plurality of elements refers to not only all of the plurality of elements, but also each one or all of the combinations thereof excluding the rest of the plurality of elements.

Figure 1:
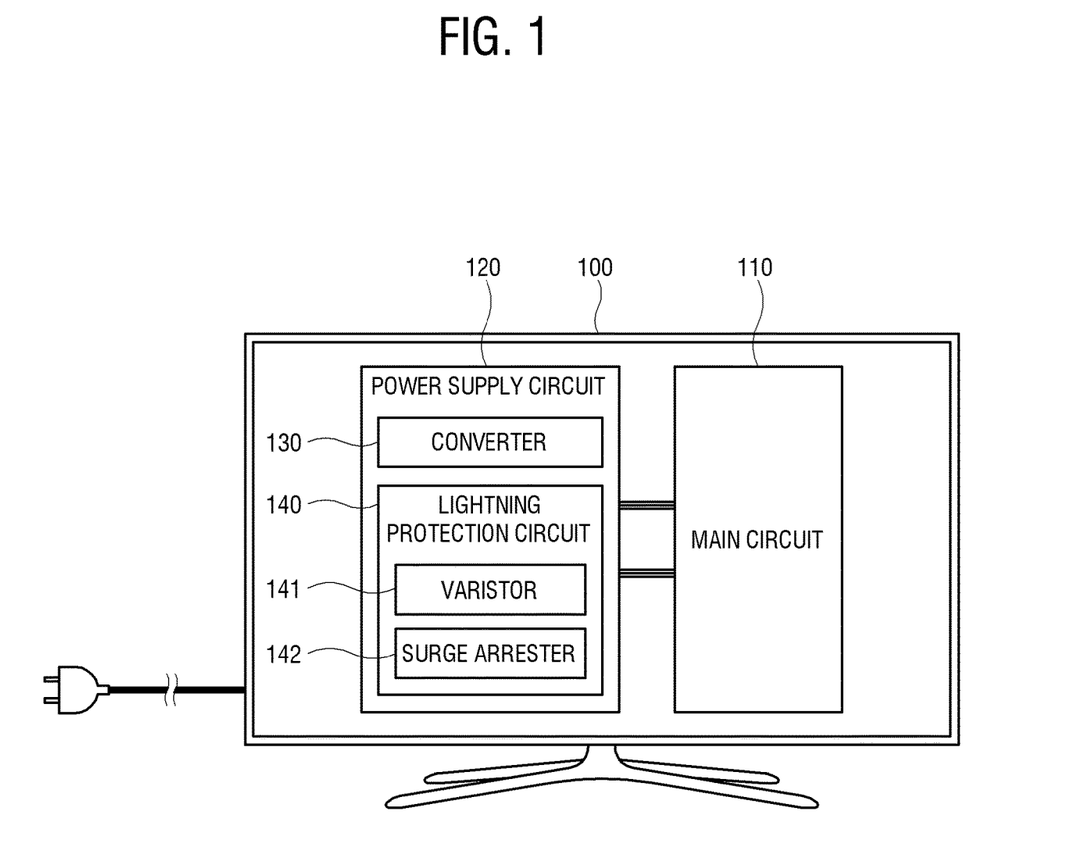
FIG. 1 is a diagram illustrating an example of an electronic apparatus and a configuration thereof according to an embodiment.

FIG. 1 is a diagram illustrating an example of an electronic apparatus and a configuration thereof according to an embodiment. An electronic apparatus 100 may be implemented as a display apparatus capable of displaying an image. As an example, the electronic apparatus 100 may include a TV, a computer, a smartphone, a tablet, a portable media player, a wearable device, a video wall, an electronic frame, and the like. In addition, the electronic apparatus 100 may be implemented as various types of devices, such as an image processing device such as a set-top box without a display, household appliances such as a refrigerator and a washing machine, and an information processing device such as a computer body. Hereinafter, for convenience of explanation, it will be assumed that the electronic apparatus 100 is implemented as a TV, but the electronic apparatus of the disclosure is not limited thereto and may be applied to various electronic apparatuses such as the set-top box other than the TV.

In one embodiment, the electronic apparatus 100 includes a main circuit 110 and a power supply circuit 120 as illustrated in FIG. 1.

The main circuit 110 is a circuit that enables the electronic apparatus 100 to perform main operations. The power supply circuit 120 supplies power to the main circuit 110. The power supply circuit 120 may include a converter 130 and a lightning protection circuit 140, and the lightning protection circuit 140 may include a varistor 141 and a surge arrester 142. The varistor 141 according to an embodiment is a device whose resistance is significantly lowered when a high voltage is applied, and is a device for protecting other electronic components from the high voltage. The varistor 141 does not affect peripheral circuits like a non-conductor within a rated voltage (or 'breakdown voltage'), but has a low resistance when an overvoltage that is higher than the rated voltage occurs, so a current is discharged to a ground through the varistor, thereby serving to protect the circuits. However, when only the varistor is used, if the rated voltage is low, the varistor may not withstand the voltage and may be destroyed when an overvoltage is applied. Conversely, when the rated voltage of the varistor is high, the breakdown voltage of the component needs to be large, so design constraints may increase and costs may increase.

Therefore, in an embodiment, the surge arrester 142 is connected in series to the varistor 141. Accordingly, the varistor 141 and the surge arrester 142 share a voltage as an overvoltage is applied. Since the surge arrester 142 is short-circuited when a second rated voltage is exceeded, if an input voltage is clamped to the first rated voltage of the varistor 141 when an overvoltage that is higher than the sum of the rated voltages of the varistor 141 and the surge arrester 142 is applied, the surge arrester 142 may be short-circuited to protect the electronic apparatus 100 from the overvoltage. At this time, since the overvoltage is limited to the sum of the rated voltages of the varistor 141 and the surge arrester 142, even if the first rated voltage of the varistor 141 is low, the surge arrester 142 lowers a voltage as much as the second rated voltage, and as a result, the varistor 141 may be prevented from being destroyed due to the overvoltage, thereby preventing the electronic apparatus 100 and setting the breakdown voltage of the connected devices to be low.

The components included in the electronic apparatus 100 are not limited to the above-described embodiment, and may be implemented by excluding or changing some components or including additional other components.

Figure 2:
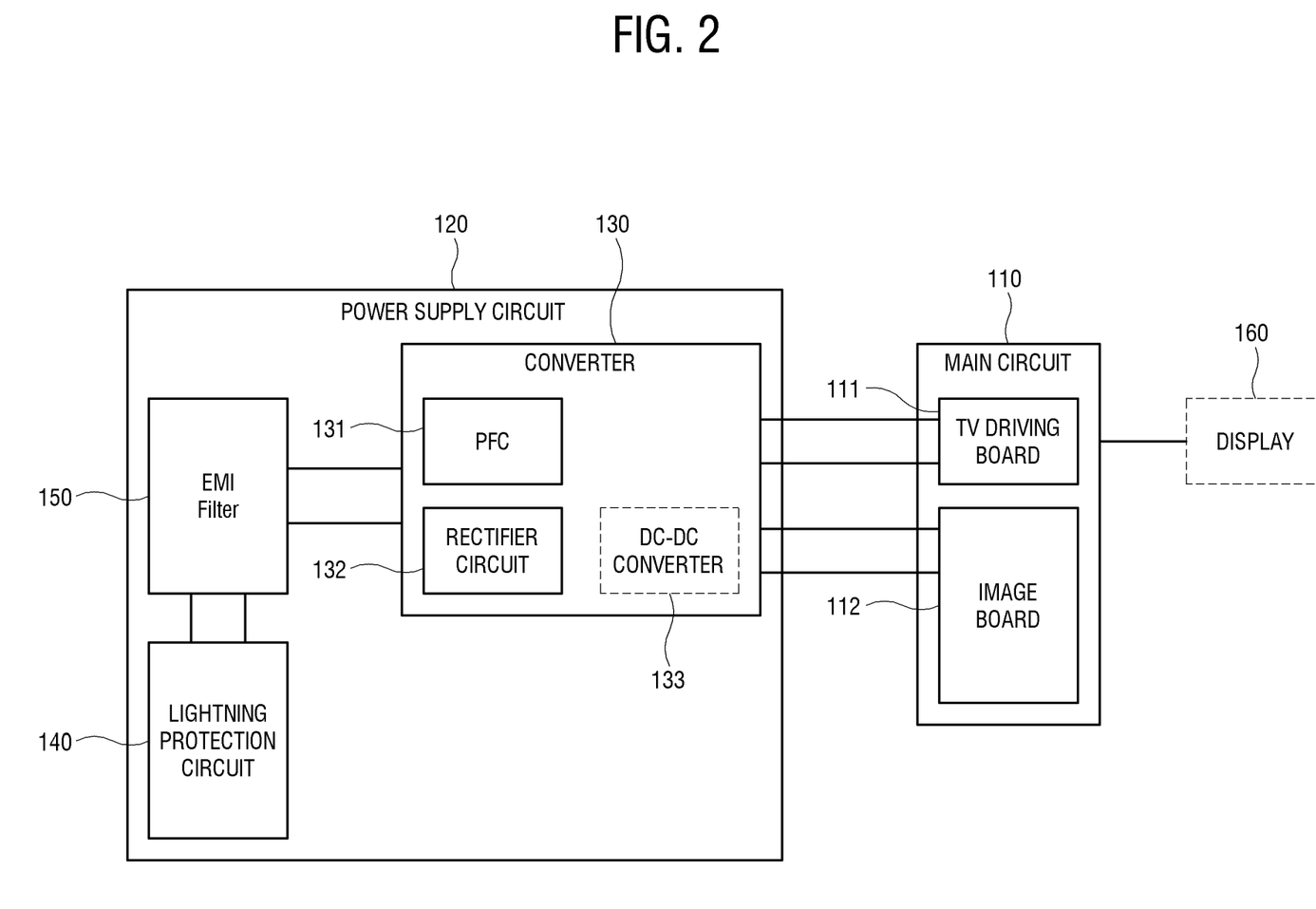
FIG. 2 is a block diagram illustrating a configuration of an electronic apparatus according to an embodiment.

FIG. 2 is a block diagram illustrating a configuration of the electronic apparatus according to an embodiment. The electronic apparatus 100 may be implemented as a display apparatus. In this case, the main circuit 110 may include a TV driving board 111 and an image board 112. The TV driving board 111 according to the present embodiment may include a timing controller that processes image data and generates a timing control signal, a backlight driving circuit that drives backlight such as LED, and the like in order to drive a display 160 such as an LCD panel, an LED panel, and an OLED panel. According to the present embodiment, the image board 112 may be implemented by mounting circuit components, such as various chipsets, memories, electronic components, and wirings, for performing each process on a printed circuit board (PCB). In this case, the electronic apparatus 100 may include a processor mounted on the image board 112, which will be described in more detail below. However, this is only an example, and these components may be provided on a plurality of printed circuit boards communicatively connected to each other. The processor may be implemented as a group of individual components capable of independently performing each process, or may be implemented as a form included in a main system-on-chip (SoC) in which various functions are integrated. For example, the main SoC may further include at least one of a central processing unit (CPU), an application processor (AP), or a microprocessor.

The power supply circuit 120 may include a converter 130, a lightning protection circuit 140, and an electromagnetic interference (EMI) filter 150 that removes noise of AC power. The converter 130 of the power supply circuit 120 may be implemented as, for example, a switching mode power supply (SMPS), and may convert input power, that is, AC power, into DC power of a predetermined level. The converter 130 may include a rectifier circuit 132, a power factor correction circuit (PFC) 131 that adjusts a power factor (PF) to convert AC power into DC power, and a DC-DC converter 133. The rectifier circuit 132 may be implemented as a bridge diode circuit that may be configured with a plurality of diodes and performs full-wave rectification on external power. However, the rectifier circuit 132 may implement not only as a full-wave rectification method, but also a half-wave rectification method and the like. In addition, the rectifier circuit 132 may not only implement a bridge method, but also a non-bridge method.

The power factor correction circuit 131 corrects the power factor of the DC voltage output from the rectifier circuit 132 so that the DC voltage is provided as an operating voltage of each component of the electronic apparatus 100. The power factor correction circuit 131 may correct the power factor by reducing reactive power of the AC voltage and increasing active power of the AC voltage or matching phases of the voltage/current.

The DC-DC converter 133 supplies operating power to each component of the electronic apparatus 100 such as the TV driving board 111 and the image board 112 based on the power converted by the power factor correction circuit 132. The DC-DC converter 133 may be implemented so that the DC power has a DC level required for the operation of each component of the electronic apparatus 100. The implementation form of the DC-DC converter 133 in the electronic apparatus 100 is not limited to this embodiment, and may be implemented as an isolated DC-DC converter, a flyback converter, a forward converter, or the like.

Figure 3:
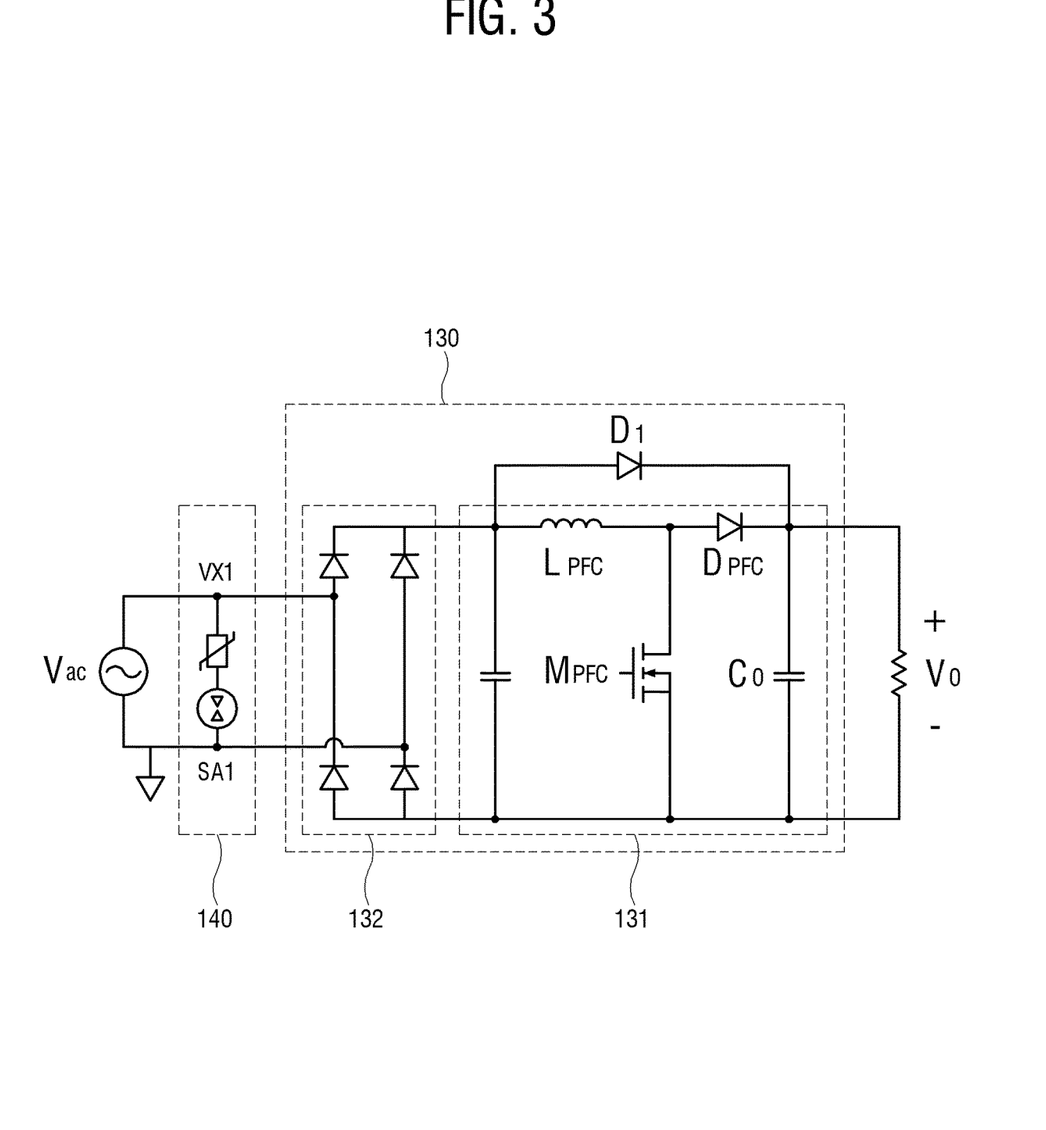
FIG. 3 is a diagram illustrating a power supply circuit of an electronic apparatus according to an embodiment.

FIG. 3 is a diagram illustrating the power supply circuit of the electronic apparatus according to an embodiment. The lightning protection circuit 140 according to the present embodiment includes a varistor VX1 and a surge arrester SA1 connected in series with each other. The varistor VX1 and the surge arrester SA1 connected in series are connected to both ends of an external power supply Vac, and share the same ground as the external power supply Vac. In one embodiment, the external power supply Vac is implemented as a commercial AC power supply, but is not limited thereto. The rectifier circuit 132 and the power factor correction circuit 131 are sequentially connected behind a pair of varistor VX1 and surge arrester SA1. In one embodiment, as illustrated in FIG. 3, the power factor correction circuit 131 may be designed as a switching type PFC AC/DC converter including a switching device MPFC that is turned on or off at a predetermined ratio according to, for example, a pulse width modulation (PWM) control signal, but the implementation form thereof is not limited thereto. When the switching device MPFC is turned on, a current flows through a path of an inductor LPFC and the switching device MPFC, and in this process, power is stored in the inductor LPFC. On the other hand, when the switching device MPFC is turned off, a current flows through the path of the inductor LPFC and a capacitor Co, and in this process, the power stored in the inductor LPFC is transmitted to the capacitor Co. The power transmitted to the capacitor Co, which is a DC voltage of a predetermined level, may be provided to, as an operating voltage, a load, that is, each component of the electronic apparatus 100.

According to the embodiment, when an overvoltage is applied to the external power supply Vac, the overvoltage is clamped to a magnitude of the first rated voltage of the varistor VX1, and the surge arrester SA1 is short-circuited at the second rated voltage. Specifically, when the voltage applied to the varistor VX1 exceeds the first rated voltage, the resistance becomes very small, and the current is discharged to the ground through the varistor VX1. That is, the voltage applied to the varistor VX1 is clamped to the magnitude of the first rated voltage of the varistor VX1. On the other hand, when the voltage applied to the surge arrester SA1 exceeds the second rated voltage, the surge arrester SA1 is rapidly short-circuited. The first rated voltage of the varistor VX1 is designed to correspond to a breakdown voltage of a device of the converter 130, for example, the switching device MPFC. The second rated voltage of the surge arrester SA1 is designed in such a magnitude that the sum of the second rated voltage of the surge arrester SA1 and the first rated voltage of the varistor VX1 may sufficiently protect the electronic apparatus 100 from the overvoltage. Therefore, since an overvoltage higher than the breakdown voltage of the device is limited by the lightning protection circuit 140, the devices of the rectifier circuit 132 and the power factor correction circuit 131 are safely protected at a low cost while minimizing the constraints of the circuit design.

Figure 4:
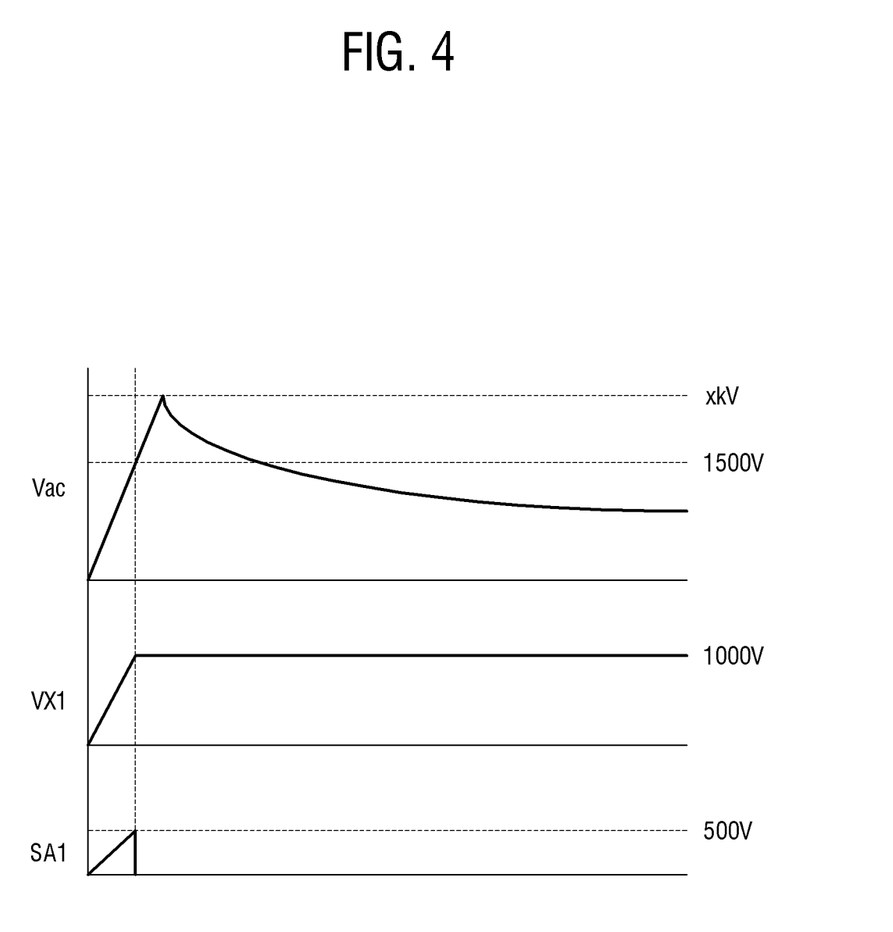
FIG. 4 is a diagram illustrating a waveform of a voltage during an operation of a lightning protection circuit according to an embodiment.

FIG. 4 is a diagram illustrating waveforms of voltages during the operation of the lightning protection circuit according to the embodiment shown in FIG. 3. Referring to FIG. 3, it is assumed that the first rated voltage of the varistor VX1 of FIG. 3 is 1 kV and the second rated voltage of the surge arrester SA1 is 500 V. Here, since the first rated voltage of the varistor VX1 corresponds to the breakdown voltage of the device of the converter 130, it is assumed that the breakdown voltage of the switching device MPFC and the like of the converter 130 is 1 kV. In the case of a normal situation where the input voltage from the external power supply Vac is lower than the breakdown voltage of the device of the converter 130, that is, when the input voltage is less than 1 kV, the input voltage is normally transmitted to the converter 130 at the rear stage. Further, in this case, since the input voltage is lower than the sum (1.5 kV) of the rated voltages of the varistor VX1 and the surge arrester SA1, the varistor VX1 and the surge arrester SA1 are not clamped or short-circuited. In this case, since the input voltage is lower than the breakdown voltage of the devices of the converter 130, the devices of the converter 130 do not have a problem due to the overvoltage.

On the other hand, when an overvoltage of several thousands of kV due to lightning or the like is applied as the input voltage, the input voltage may exceed 1.5 kV in some sections. In this case, the applied input voltage is distributed and applied to the varistor VX1 and the surge arrester SA1, and the varistor VX1 is clamped or the surge arrester SA1 is short-circuited depending on whether the voltage applied to the varistor VX1 or the surge arrester SA1 reaches the rated voltage. That is, when the voltage applied to the varistor VX1 reaches 1 kV, the varistor VX1 is clamped to 1 kV, and when the voltage applied to the surge arrester SA1 reaches 500 V, the surge arrester SA1 is short-circuited. Either of the varistor VX1 or the surge arrester SA1 may be first clamped or short-circuited, but FIG. 4 illustrates that the varistor VX1 or the surge arrester SA1 are clamped or short-circuited at the same time. Even if the varistor VX1 or the surge arrester SA1 are clamped or short-circuited at the same time or either of the varistor VX1 or the surge arrester SA1 is first clamped or short-circuited, the rated voltage that the varistor VX1 and the surge arrester SA1 may withstand to the maximum of 1.5 kV. Accordingly, the varistor VX1 and the surge arrester SA1 may limit an overvoltage higher than the breakdown voltage of the device of the converter 130. On the other hand, when both the varistor VX1 and the surge arrester SA1 are clamped and short-circuited, the voltage transmitted to the converter 130 at the rear stage becomes 1 kV that the varistor VX1 clamps. Accordingly, since the voltage transmitted to the converter 130 is at a level of 1 kV which is the breakdown voltage of the device, the devices of the converter 130 are safely protected from the overvoltage. The first rated voltage of the varistor VX1 of the present embodiment is illustrated as the same as the breakdown voltage of the device of the converter 130, but is not limited thereto, and may be designed to have a magnitude slightly higher than the breakdown voltage of the device in consideration of an operating margin.

In addition, an overvoltage such as a surge occurs for a very short time and then disappears, but the surge may exist until the surge arrester SA1 reaches the second rated voltage and is short-circuited. In this case, the input voltage higher than the breakdown voltage of the device may be temporarily transmitted until the surge arrester SA1 is short-circuited. For example, there may be a section in which the input voltage higher than the breakdown voltage of the device is transmitted to the converter 130 until the input voltage exceeds 1 kV but the voltage applied to the surge arrester SA1 becomes 500 V and is short-circuited. In this case, the input voltage exceeding 1 kV, which is the breakdown voltage of the device, may be applied to the device up to a magnitude of about 1.5 kV which is the sum of the rated voltages of the varistor VX1 and the surge arrester SA1. Usually, this situation is a temporary, and when the surge arrester SA1 is short-circuited, the surge arrester SA1 is clamped to 1 kV by the varistor VX1 even if the input voltage exceeds 1.5 kV. However, the converter 130 may more safely prevent damage to other devices by allowing a current due to an overvoltage to flow into the capacitor Co through a bypass diode D1 in the corresponding section. At this time, when designing the capacity of the capacitor Co, the capacitor Co is designed to have a sufficient size to charge electric charges due to an overvoltage in the capacitor Co until the surge arrester SA1 is short-circuited after the input voltage higher than the breakdown voltage of the device is transmitted.

Accordingly, according to the present embodiment, since the varistor VX1 and the surge arrester SA1 distribute a voltage stress, the devices in the circuit are protected even if the breakdown voltage is only as low as the first rated voltage of the varistor VX1. That is, even if a varistor having a rated voltage of 1 kV is used, the effect of using a varistor having a rated voltage of 1.5 kV can be obtained, so the constraints of the circuit design may be reduced and the costs may be minimized.

Figure 5:
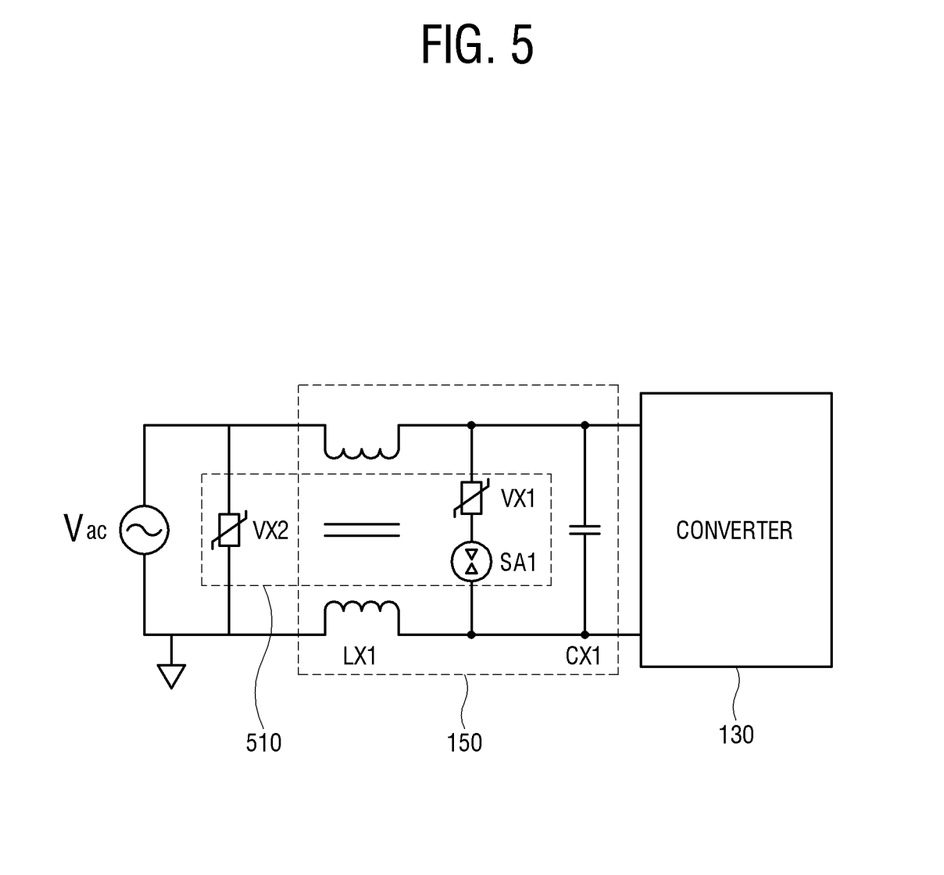
FIG. 5 is a diagram illustrating a power supply circuit of an electronic apparatus according to an embodiment.

FIG. 5 is a diagram illustrating the power supply circuit of the electronic apparatus according to an embodiment. A description of the same or similar configuration to the electronic apparatus illustrated in FIGS. 1 to 6 with reference to the electronic apparatus illustrated in FIG. 5 will be omitted. FIG. 5 illustrates a state in which a second varistor VX2 is connected in multiple stages to the pair of varistor VX1 and surge arrester SA1 in the power supply circuit. The lightning protection circuit 510 of the present embodiment is implemented in the form in which the second varistor VX2 is connected in parallel between the pair of varistor VX1 and surge arrester SA1 and the external power supply Vac, and further includes an EMI filter 150 that includes a coil LX1 provided between the second varistor VX2 and the combination of the varistor VX1 and a capacitor CX1, where the capacitor CX1 is connected in parallel with the pair of the varistor VX1 and the surge arrester SA1 connected in series.

The EMI filter 150 is a filter that filters out noise mixed in power by using the mutual induction action between the coil LX1 and the capacitor CX1. If there is no EMI filter 150, when an overvoltage is applied to the external power supply Vac, a voltage is clamped in a varistor having a low rated voltage among varistors in the lightning protection circuit 510. Since the varistor is connected in parallel with both ends of the external power supply Vac, a voltage may be applied to both the varistors VX1 and VX2. In this case, a varistor having a low rated voltage is clamped, so the varistor having the low rated voltage may be destroyed by an overvoltage. However, if the EMI filter 150 exists as in the present embodiment, when an overvoltage is applied from the external power supply Vac, the current due to the overvoltage is prevented from rapidly increasing by the coil LX1 of the EMI filter 150, so the overvoltage is preferentially applied to the second varistor VX2 provided close to the external power supply Vac and the varistor VX1 and the surge arrester SA1 provided at the rear stage of the coil LX1 of the EMI filter 150 are temporarily not affected by the overvoltage. Therefore, according to the present embodiment, when the input voltage reaches a magnitude of a third rated voltage of the second varistor VX2, the second varistor VX2 clamps the input voltage to the magnitude of the third rated voltage, and the second varistor VX2 applies the voltage corresponding to the magnitude clamped by the second varistor VX2 to the pair of varistor VX1 and surge arrester SA1. Thereafter, when the voltage applied to the varistor VX1 reaches the first rated voltage, the varistor VX1 is clamped, and when the voltage applied to the surge arrester SA1 reaches the second rated voltage, the surge arrester SA1 is short-circuited. At this time, the third rated voltage of the second varistor VX2 is designed to be equal to or higher than the sum of the rated voltages of the varistor VX1 and the surge arrester SA1. In this case, the input voltage is primarily clamped by the second varistor VX2, and is secondarily clamped by the varistor VX1 with a voltage of a lower magnitude. Accordingly, according to the present embodiment, the load on the lightning protection circuit may be reduced by distributing a voltage stress to be applied to each varistor and the surge arrester by providing one more varistor than when there are only one varistor and one surge arrester. In addition, since the voltage finally applied to the converter 130 is further lowered, a device having a lower breakdown voltage may be used.

Figure 6:
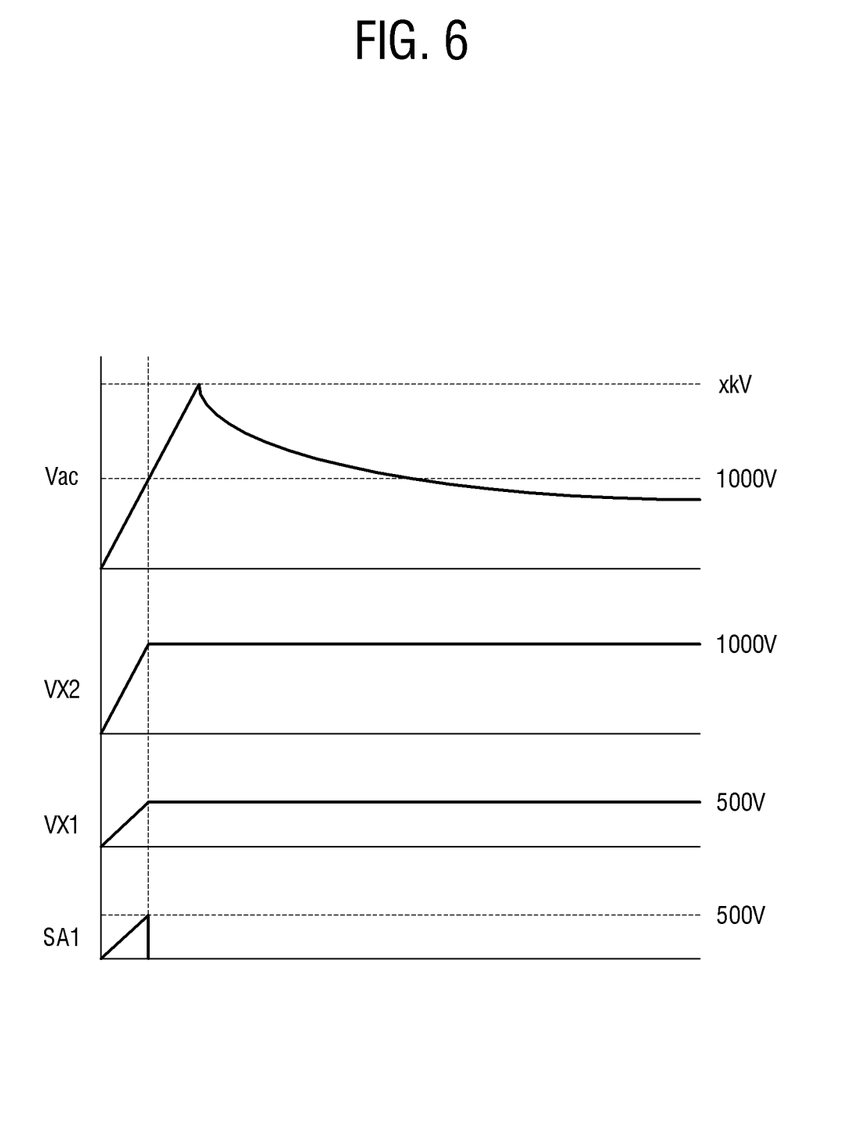
FIG. 6 is a diagram illustrating waveforms of voltages during the operation of a lightning protection circuit according to an embodiment.

FIG. 6 is a diagram illustrating waveforms of voltages during the operation of the lightning protection circuit according to the embodiment of FIG. 5. Referring to FIG. 5, it is assumed that the third rated voltage of the second varistor VX2 of FIG. 5 is 1 kV, the first rated voltage of the varistor VX1 is 500 V, and the second rated voltage of the surge arrester SA1 is 500 V. Meanwhile, since the first rated voltage of the varistor VX1 corresponds to the breakdown voltage of the device of the converter 130, it is assumed that the breakdown voltage of the switching device MPFC and the like of the converter 130 is 500 V. In the case of a normal situation where the input voltage from the external power supply Vac is lower than the breakdown voltage of the device of the converter 130, that is, when the input voltage is less than 500 V, the input voltage is normally transmitted to the converter 130 at the rear stage. In addition, in this case, since the input voltage is lower than the breakdown voltage of the device of the converter 130, the problem of the overvoltage does not occur.

On the other hand, when an overvoltage of several thousands of kV due to lightning or the like is applied as the input voltage, the input voltage may exceed 1 kV in some sections. Specifically, while an overvoltage is applied to the second varistor VX2, the varistor VX1 and the surge arrester SA1 are temporarily not affected by the overvoltage due to the EMI filter 150. Therefore, when the input voltage reaches 1 kV, the input voltage is clamped to 1 kV which is the third rated voltage of the second varistor VX2, and then, the voltage clamped to 1 kV by the second varistor VX2 is applied to the pair of varistor VX1 and surge arrester SA1. At this time, when the voltage applied to the varistor VX1 reaches 500 V which is the first rated voltage of the varistor VX1, the varistor VX1 is clamped, and when the voltage applied to the surge arrester SA1 reaches 500 V which is the second rated voltage of the surge arrester SA1, the surge arrester SA1 is short-circuited. Therefore, since the voltage transmitted to the converter 130 at the rear stage is limited to 500 V clamped by the varistor VX1, the devices of the converter 130 are protected from an overvoltage.

Accordingly, since the second varistor VX2, the varistor VX1, and the surge arrester SA1 distribute a voltage stress, the devices in the circuit are protected even if the breakdown voltage is only as low as the first rated voltage of the varistor VX1.

According to the embodiment of the disclosure, compared to the case of the embodiments according to FIGS. 3 and 4, the second varistor VX2 is added to the pair of varistor VX1 and surge arrester SA1, so the voltage stress of the lightning protection circuit due to the overvoltage may be further reduced, and the devices in the circuit may be protected by only having the breakdown voltage as much as 500 V which is the first rated voltage of the varistor VX1, so the devices may be protected with a lower breakdown voltage.

Figure 7:
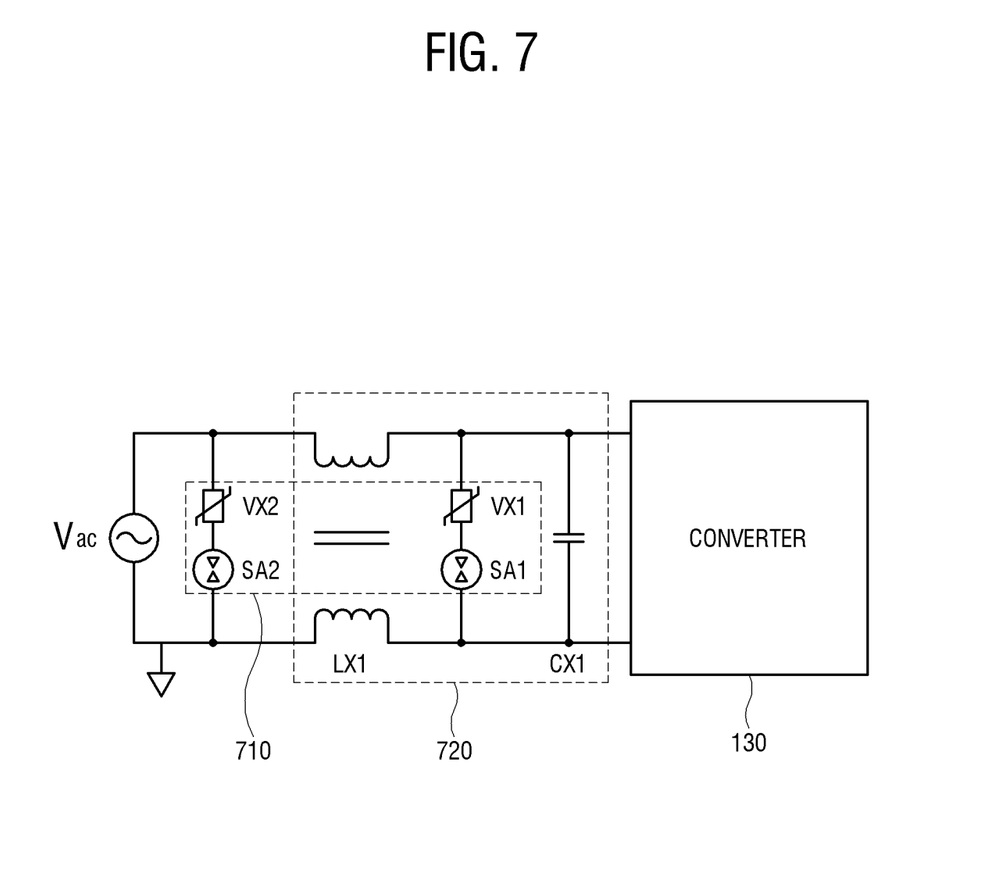
FIG. 7 is a diagram illustrating a power supply circuit of an electronic apparatus according to an embodiment.

FIG. 7 is a diagram illustrating the power supply circuit of the electronic apparatus according to an embodiment. A description of the same or similar configuration to the electronic apparatus illustrated with reference to FIGS. 1 to 6 will be omitted. FIG. 7 illustrates a state in which a pair of second varistor VX2 and second surge arrester SA2 is connected in multiple stages to the pair of varistor VX1 and surge arrester SA1 in the power supply circuit. A lightning protection circuit 710 of the present embodiment is implemented in a form in which the second varistor VX2 and the second surge arrester SA2 are connected in series, and the combination thereof are connected in parallel between the pair of varistor VX1 and surge arrester SA1 and the external power supply Vac, and further includes an EMI filter 720 that includes a coil LX1 provided between the second varistor VX2 and the varistor VX1. A capacitor CX1 is connected in parallel with the pair of varistor VX1 and surge arrester SA1. At this time, a third rated voltage of the second varistor VX2 is designed to be equal to or higher than the sum of the rated voltages of the varistor VX1 and the surge arrester SA1.

When an overvoltage is applied from the external power supply Vac, as in FIG. 5, the overvoltage is preferentially distributed and applied to the second varistor VX2 and the surge arrester SA2 provided close to the external power supply Vac by the EMI filter 720. When the second surge arrester SA2 is short-circuited, a voltage of a magnitude clamped by the second varistor VX2 is applied to the varistor VX1 and the surge arrester SA1 provided at the rear stage of the coil LX1 of the EMI filter 720. Thereafter, when the voltage applied to the varistor VX1 reaches the first rated voltage, the varistor VX1 is clamped, and when the voltage applied to the surge arrester SA1 reaches the second rated voltage, the surge arrester SA1 is short-circuited. Accordingly, even if an overvoltage is applied from an external power supply, a voltage is applied to the device of the converter as much as a magnitude of the first rated voltage of the varistor VX1, so the devices may be protected.

According to the present embodiment, the load on the lightning protection circuit may be reduced by distributing a voltage stress to be applied to each varistor and the surge arrester by putting the pair of varistor and surge arrester in multiple stages. In addition, since the voltage finally applied to the converter 130 is further lowered, a device having a lower breakdown voltage may be used.

Figure 8:
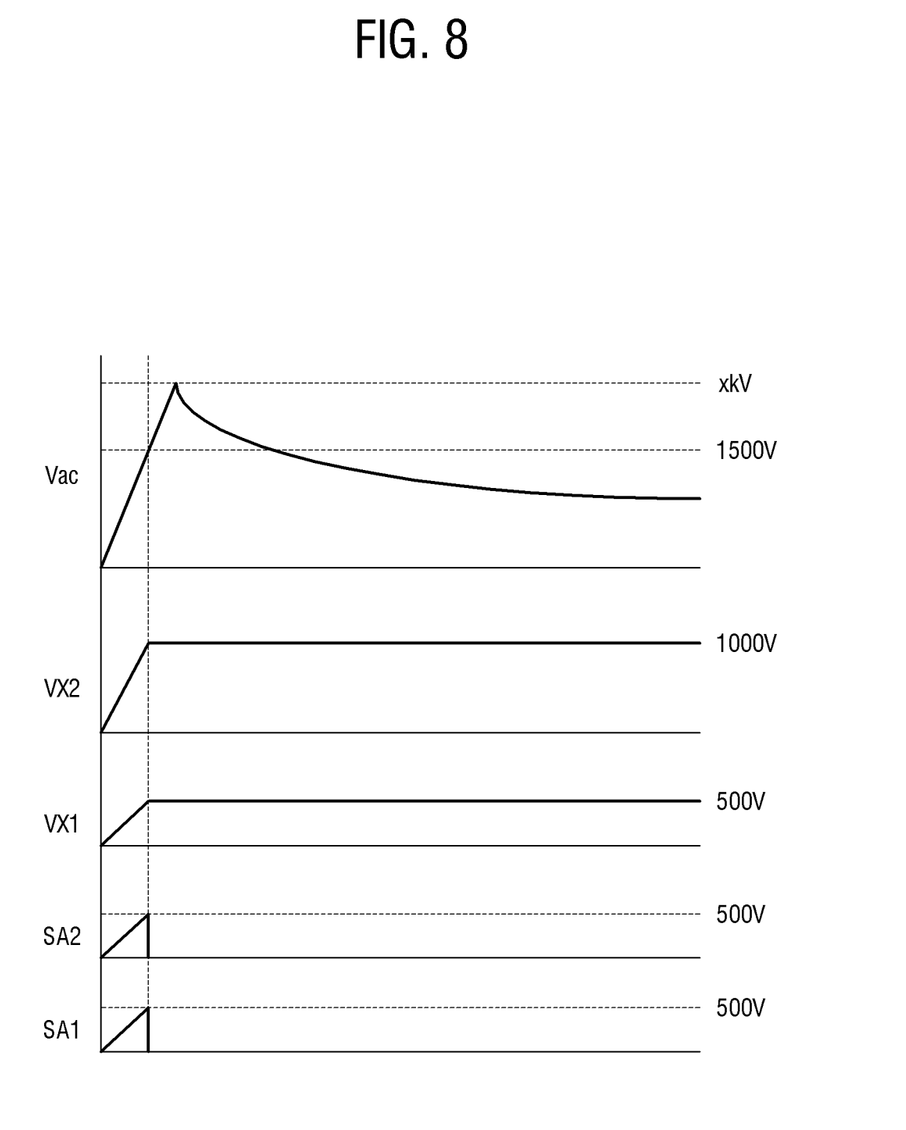
FIG. 8 is a diagram illustrating waveforms of voltages during the operation of a lightning protection circuit according to an embodiment.

FIG. 8 is a diagram illustrating waveforms of the voltages during the operation of the lightning protection circuit according to the embodiment of FIG. 7. Referring to FIG. 7, it is assumed that the third rated voltage of the second varistor VX2 of FIG. 7 is 1 kV, a fourth rated voltage of the second surge arrester SA2 is 500 V, the first rated voltage of the varistor VX1 is 500 V, and the second rated voltage of the surge arrester SA1 is 500 V. Also, it is assumed that the breakdown voltage of the device of the converter 130 is 500 V.

When the input voltage from the external power Vac is 500 V or lower, the input voltage is normally transmitted to the converter 130 at the rear stage. In this case, since the input voltage is lower than the breakdown voltage of the devices of the converter 130, the devices of the converter 130 do not have a problem due to the overvoltage.

On the other hand, when an overvoltage of several thousands of kV due to lightning or the like is applied as the input voltage, the input voltage may exceed 1.5 kV in some sections. Specifically, while an overvoltage is applied to the second varistor VX2 and the second surge arrester SA2, the overvoltage is temporarily not applied to the varistor VX1 and the surge arrester SA1 by the EMI filter 720. Therefore, when the input voltage reaches 1.5 kV, the input voltage is clamped to 1 kV which is the third rated voltage of the second varistor VX2 and is short-circuited to 500 V which is the fourth rated voltage of the second surge arrester SA2, and then the voltage clamped to 1 kV by the second varistor VX2 is applied to the pair of varistor VX1 and surge arrester SA1. At this time, when the voltage applied to the varistor VX1 reaches 500 V which is the first rated voltage of the varistor VX1, the varistor VX1 is clamped, and when the voltage applied to the surge arrester SA1 reaches 500 V which is the second rated voltage of the surge arrester SA1, the surge arrester SA1 is short-circuited. Therefore, since the voltage transmitted to the converter 130 at the rear stage is limited to 500 V clamped by the varistor VX1, the devices of the converter 130 are protected from an overvoltage.

According to the embodiment, the pair of second varistor VX2 and second surge arrester SA2 is connected in parallel to the pair of varistor VX1 and surge arrester SA1, so the voltage stress caused by the overvoltage may be reduced, and the devices in the circuit may be protected by only having the breakdown voltage as much as 500 V which is the first rated voltage of the varistor VX1, so the devices may be protected even with a lower breakdown voltage.

Figure 9:
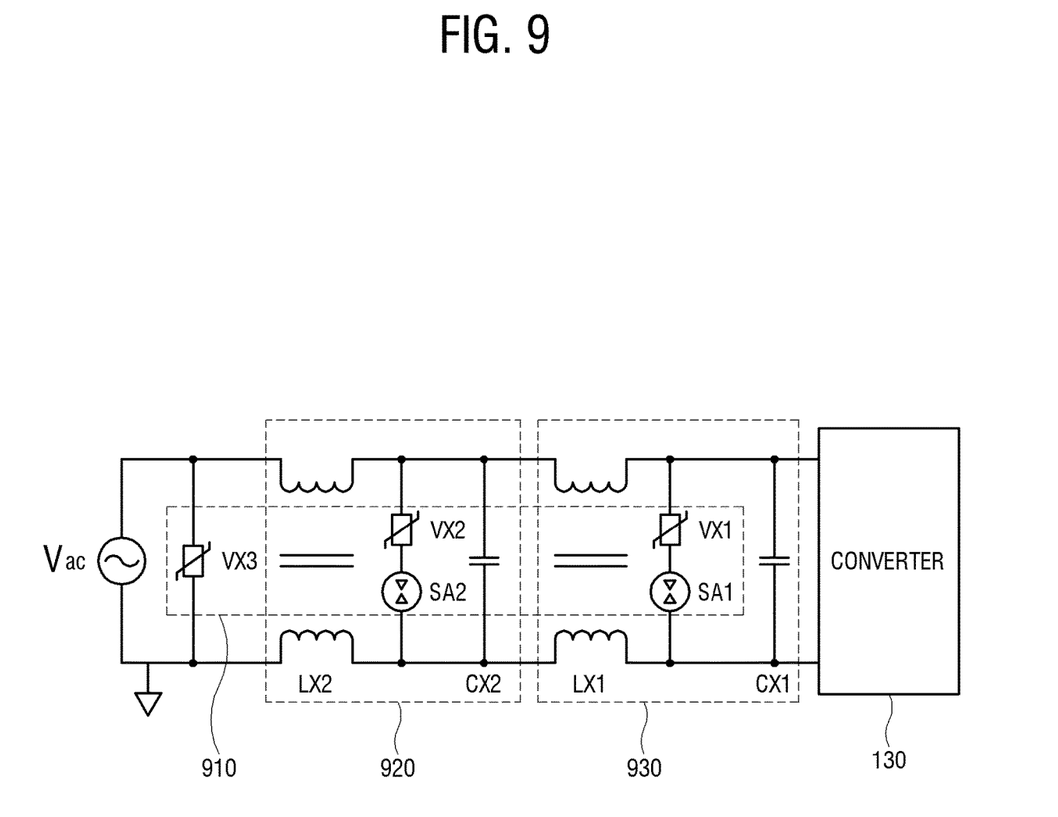
FIG. 9 is a diagram illustrating a power supply circuit of an electronic apparatus according to an embodiment.

FIG. 9 is a diagram illustrating the power supply circuit of the electronic apparatus according to an embodiment. A description of the same or similar configuration to the electronic apparatus illustrated with reference to FIGS. 1 to 8 will be omitted. FIG. 9 illustrates a state in which the pair of second varistor VX2 and second surge arrester SA2 and another third varistor VX3 are connected in multiple stages to the pair of varistor VX1 and surge arrester SA1 in the power supply circuit.

In this case, as illustrated in FIG. 9, the embodiment of the disclosure includes a first EMI filter 930 and a second EMI filter 920 between the lightning protection circuits 910 connected in multiple stages. The second EMI filter 920 is provided close to the external power supply Vac, and the first EMI filter 930 is provided at a rear stage of the second EMI filter 920. The first EMI filter 930 includes a coil LX1 provided at a rear stage of the capacitor CX2 of the second EMI filter 920, and a capacitor CX1 connected in parallel with the pair of varistor VX1 and surge arrester SA1. The third varistor VX3 is implemented in a form connected in parallel between the pair of second varistor VX2 and second surge arrester SA2 and the external power supply Vac. The second EMI filter 920 includes a coil LX2 provided between the third varistor VX3 and the second varistor VX2, and a capacitor CX2 connected in parallel with the pair of second varistor VX2 and second surge arrester SA2. At this time, when designing, a fifth rated voltage of the third varistor VX3 is designed to be the same as or higher than the sum of the rated voltages of the second varistor VX2 and the second surge arrester SA2, and the third rated voltage of the second varistor VX2 is designed to be equal to or higher than the sum of the rated voltages of the varistor VX1 and the surge arrester SA1.

According to the present embodiment, when an overvoltage is applied from the external power supply Vac, the overvoltage is preferentially applied to the third varistor VX3 provided close to the external power supply Vac by the second EMI filter 920 similar to the embodiment illustrated in FIG. 5 or 7. In addition, a magnitude of a voltage clamped by the third varistor VX3 is distributed and applied to the second varistor VX2 and the second surge arrester SA2 provided at the rear stage of the coil LX2 of the second EMI filter 920. When the second surge arrester SA2 is short-circuited, a voltage of a magnitude clamped by the second varistor VX2 is distributed and applied to the varistor VX1 and the surge arrester SA1 provided at the rear stage of the coil LX1 of the first EMI filter 930. Thereafter, when the voltage applied to the varistor VX1 reaches the first rated voltage, the varistor VX1 is clamped, and when the voltage applied to the surge arrester SA1 reaches the second rated voltage, the surge arrester SA1 is short-circuited. Accordingly, even if an overvoltage is applied from an external power supply, a voltage is applied to the device of the converter at the magnitude of the first rated voltage of the varistor VX1, so the devices may be protected.

According to the present embodiment, since the voltage finally applied to the converter 130 decreases as the varistors and the surge arresters are connected in multiple stages, a device having a lower breakdown voltage may be used.

Figure 10:
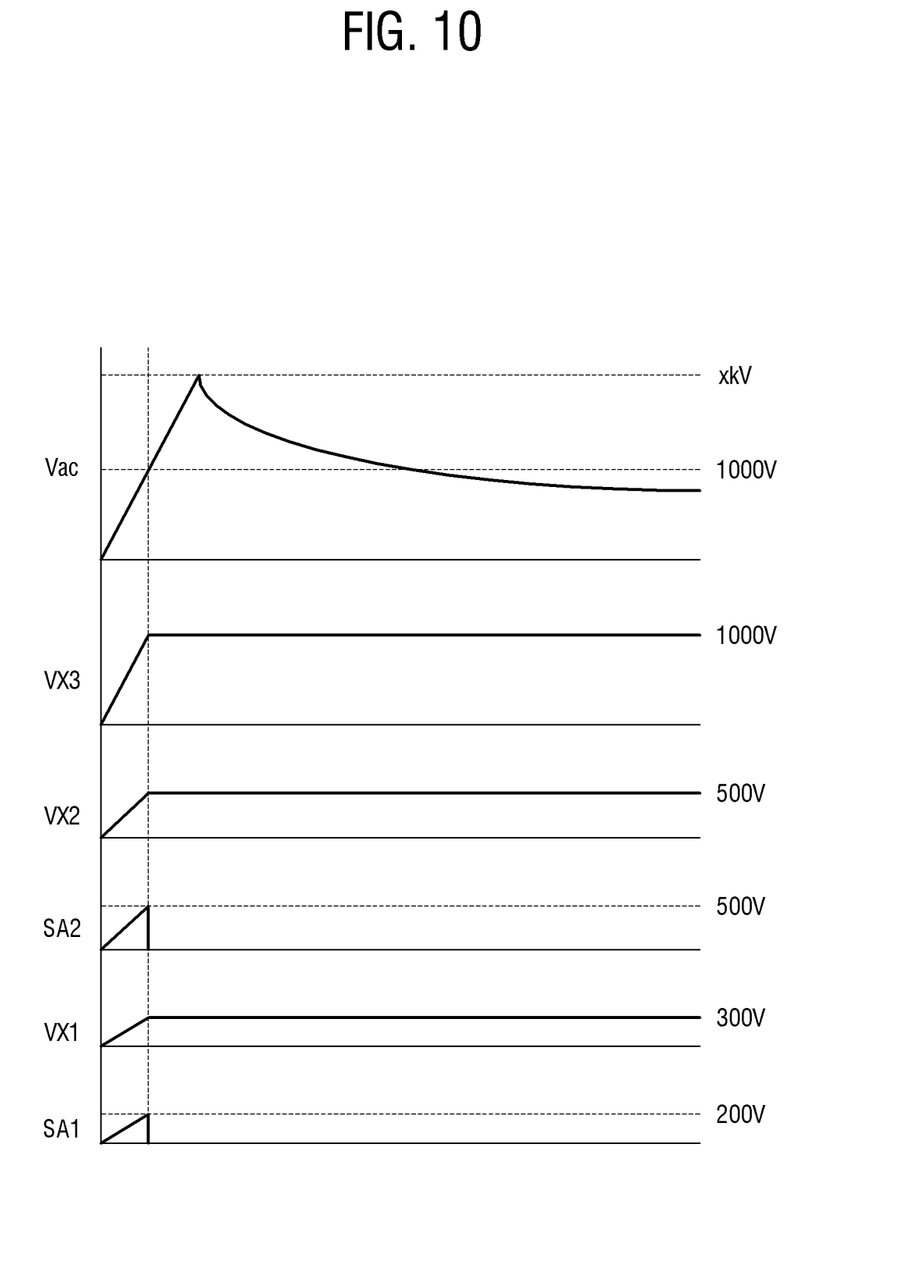
FIG. 10 is a diagram illustrating waveforms of voltages during the operation of a lightning protection circuit according to an embodiment.

FIG. 10 is a diagram illustrating waveforms of voltages during the operation of the lightning protection circuit according to the embodiment of FIG. 9.

Referring to FIG. 9, it is assumed that the fifth rated voltage of the third varistor VX3 of FIG. 9 is 1 kV, the third rated voltage of the second varistor VX2 is 500 V, the fourth rated voltage of the second surge arrester SA2 is 500 V, the first rated voltage of the varistor VX1 is 300 V, and the second rated voltage of the surge arrester SA1 is 200 V. In addition, it is assumed that the breakdown voltage of the device of the converter 130 is 300 V.

When the input voltage from the external power supply Vac is lower than the breakdown voltage of the device of the converter 130, that is, when the input voltage is lower than 300 V, the input voltage is normally transmitted to the converter 130 at the rear stage. In this case, since the input voltage is lower than the breakdown voltage of the devices of the converter 130, the devices of the converter 130 do not have a problem due to the overvoltage.

On the other hand, when an overvoltage of several thousands of kV due to lightning or the like is applied as the input voltage, the input voltage may exceed 1 kV in some sections. Specifically, while an overvoltage is applied to the third varistor VX3, the overvoltage is temporarily not applied to the varistors and the surge arresters connected to the rear stage due to the EMI filters 920 and 930. Therefore, when the input voltage reaches 1 kV, the input voltage is clamped to 1 kV which is the fifth rated voltage of the third varistor VX3, and then, the voltage clamped to 1 kV by the second varistor VX2 is applied to the pair of second varistor VX2 and second surge arrester SA2. At this time, when the voltage applied to the second varistor VX2 reaches 500 V which is the third rated voltage of the second varistor VX2, the second varistor VX2 is clamped, and when the voltage applied to the second surge arrester SA2 reaches 500 V which is the fourth rated voltage of the second surge arrester SA2, the second surge arrester SA2 is short-circuited. Since the voltage is also applied to the varistor and the surge arrester connected to the rear stage, the voltage transmitted to the converter 130 at the rear stage is limited to 300 V clamped by the final varistor VX1, so the devices of the converter 130 are protected from the overvoltage.

The embodiments of the disclosure have been shown and described above, however, the embodiments of the disclosure are not limited to the foregoing specific embodiments, and it is apparent that various modifications, substitutions, and improvements may be made by one of ordinary skill in the art in the technical field to which the disclosure belongs, without departing from the scope of the disclosure. Also, it should be understood that such modifications, substitutions, and improvements shall fall within the protection scope of the disclosure, and should not be construed independently from the technical idea or prospect of the disclosure.

What is claimed is:

1. An electronic apparatus comprising:
a display configured to display an image;
a main circuit comprising a driving circuit configured to drive the display; and
a power supply circuit configured to receive external power from an external power supply and supply operating power to the main circuit,
wherein the power supply circuit comprises:
a converter configured to convert the external power into the operating power; and
a lightning protection circuit connected in parallel between the external power supply and an input end of the converter, wherein the lightning protection circuit comprises:
a varistor configured to have a first rated voltage corresponding to a breakdown voltage of a device of the converter; and
a surge arrester connected in series to the varistor and configured to have a second rated voltage,
wherein, based on the external power of the external power supply being higher than the first rated voltage of the varistor, the varistor is clamped so that a voltage applied to the converter does not exceed the first rated voltage,
wherein, based on a voltage applied to the surge arrester being equal to or higher than the second rated voltage, the surge arrester is short-circuited, and
wherein the lightning protection circuit further comprises a second varistor connected between a first series of the varistor and the surge arrester and the external power supply, and configured to have a third rated voltage, the third rated voltage of the second varistor being higher than a first sum of the first rated voltage of the varistor and the second rated voltage of the surge arrester.

2. The electronic apparatus of claim 1, wherein the external power supply comprises a commercial alternating current (AC) power supply, and
wherein the lightning protection circuit is connected to both ends of the commercial AC power supply.

3. The electronic apparatus of claim 1, wherein the lightning protection circuit is connected to both ends of the external power supply and shares a same ground as the external power supply.

4. The electronic apparatus of claim 1, wherein the lightning protection circuit further comprises a second surge arrester connected in series to the second varistor and configured to have a fourth rated voltage.

5. The electronic apparatus of claim 4, wherein the power supply circuit further comprises an electromagnetic interference (EMI) filter comprising a coil that is provided between the second varistor and the varistor, and a capacitor that is connected in parallel with the lightning protection circuit.

6. The electronic apparatus of claim 5, wherein the lightning protection circuit further comprises a third varistor connected between the second varistor and the external power supply.

7. The electronic apparatus of claim 6, wherein a fifth rated voltage of the third varistor is higher than a second sum of the third rated voltage of the second varistor and the fourth rated voltage of the second surge arrester.

8. The electronic apparatus of claim 6, wherein the EMI filter comprises:
a first EMI filter including a first coil that is provided between the varistor and the second varistor, and a first capacitor that is connected in parallel with the first series of the varistor and the surge arrester; and
a second EMI filter including a second coil that is provided between the second varistor and the third varistor, and a second capacitor that is connected in parallel with a second series of the second varistor and the second surge arrester.

9. The electronic apparatus of claim 1, wherein the converter comprises a power factor correction circuit configured to perform a power factor correction of the power supply circuit.

10. The electronic apparatus of claim 1, wherein the power supply circuit further comprises a synchronous bridge type rectifier circuit.

11. The electronic apparatus of claim 1, wherein the power supply circuit further comprises a bridgeless type rectifier circuit including a switch.

12. The electronic apparatus of claim 1, wherein the main circuit comprises a processor configured to execute a control program of the electronic apparatus.

13. The electronic apparatus of claim 1, wherein the converter comprises a switch mode type direct current (DC)-DC converter.

14. An electronic apparatus comprising:
a main circuit; and
a power supply circuit configured to receive external power from an external power supply and supply operating power to the main circuit,
wherein the power supply circuit comprises:
a converter configured to convert the external power into the operating power; and
a lightning protection circuit connected in parallel between the external power supply and an input end of the converter,
wherein the lightning protection circuit comprises:
a varistor configured to have a first rated voltage corresponding to a breakdown voltage of a device of the converter; and
a surge arrester connected in series to the varistor and configured to have a second rated voltage,
wherein the power supply circuit further comprises an electromagnetic interference (EMI) filter comprising a coil that is provided between the external power supply and the varistor, and a capacitor that is connected in parallel with the lightning protection circuit,
wherein, based on the external power of the external power supply being higher than the first rated voltage of the varistor, the varistor is clamped so that a voltage applied to the converter does not exceed the first rated voltage,
wherein, based on a voltage applied to the surge arrester being equal to or higher than the second rated voltage, the surge arrester is short-circuited, and
wherein the lightning protection circuit further comprises a second varistor connected between a first series of the varistor and the surge arrester and the external power supply, and configured to have a third rated voltage, the third rated voltage of the second varistor being higher than a first sum of the first rated voltage of the varistor and the second rated voltage of the surge arrester.

* * * * *